No. 612,909.  
P. & J. J. MEEHAN.  
BOILER.  
(Application filed Feb. 4, 1897.)  
(No Model.)  
Patented Oct. 25, 1898.  
3 Sheets—Sheet 2.

Witnesses:  
Inventor:

No. 612,909. Patented Oct. 25, 1898.
P. & J. J. MEEHAN.
BOILER.
(Application filed Feb. 4, 1897.)
(No Model.) 3 Sheets—Sheet 3.

Witnesses:

Inventors:
P. & J. J. Meehan
By their Attorneys

THE NORRIS PETERS CO., PHOTO-LITHO., WASHINGTON, D. C.

UNITED STATES PATENT OFFICE.

PATRICK MEEHAN AND JOHN J. MEEHAN, OF NEW CASTLE, PENNSYLVANIA.

BOILER.

SPECIFICATION forming part of Letters Patent No. 612,909, dated October 25, 1898.

Application filed February 4, 1897. Serial No. 621,960. (No model.)

*To all whom it may concern:*

Be it known that we, PATRICK MEEHAN and JOHN J. MEEHAN, residents of New Castle, in the county of Lawrence and State of Pennsylvania, have invented a new and useful Improvement in Boilers; and we do hereby declare the following to be a full, clear, and exact description thereof.

Our invention relates to an improvement in boilers. The several objects of the invention, together with its novel features, will be fully hereinafter set forth and claimed.

Figure 1:
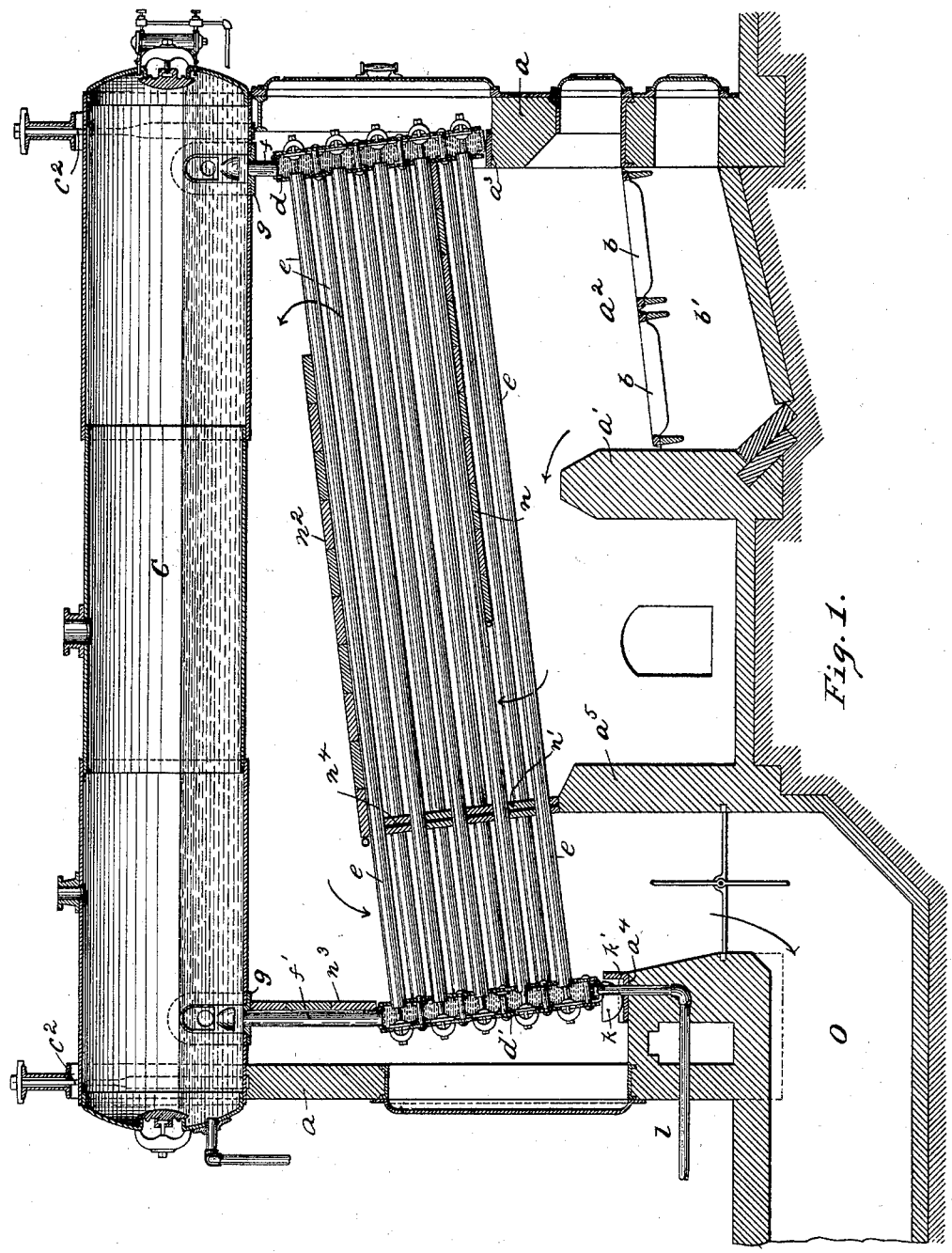
Figure 2:
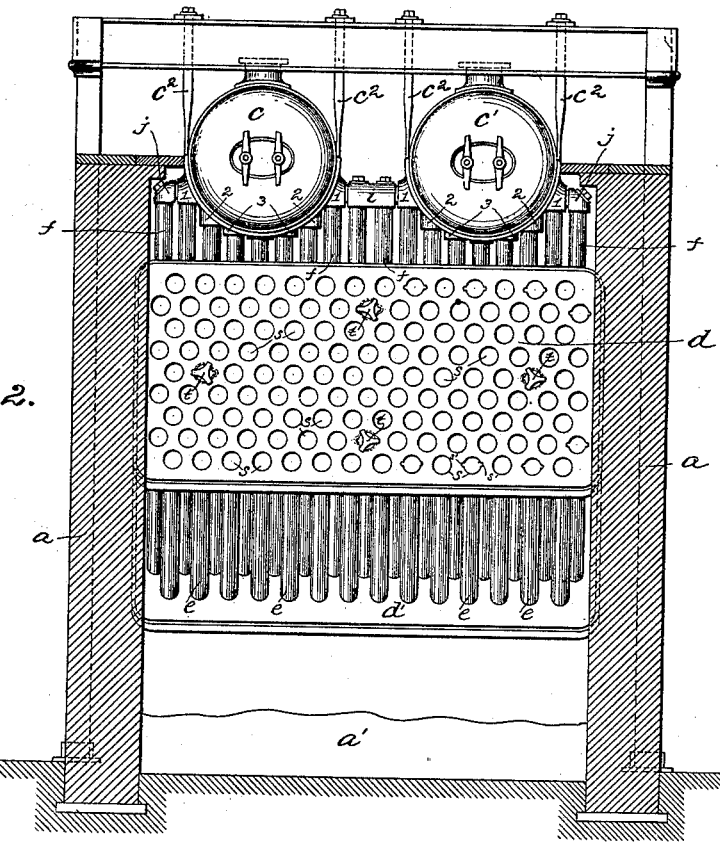
Figure 3:
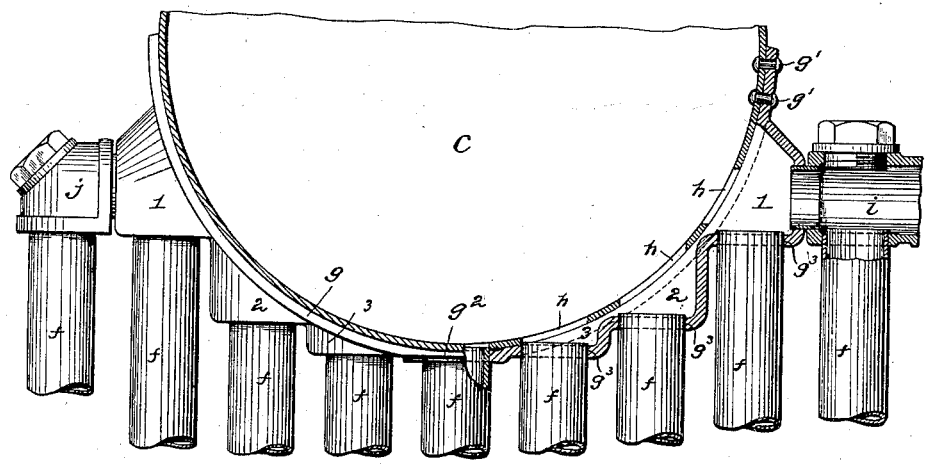
Figure 9:
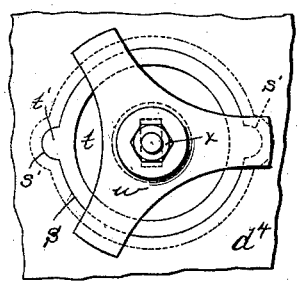
Figure 10:
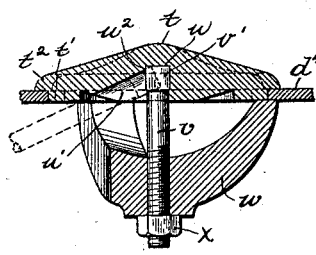
Figure 4:
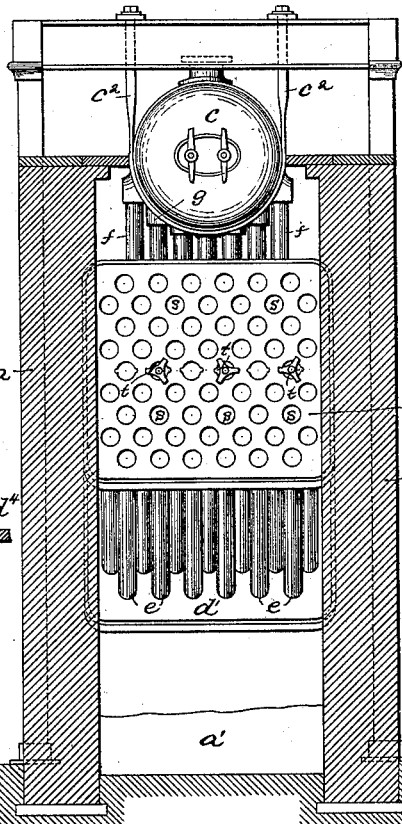
Figure 11:
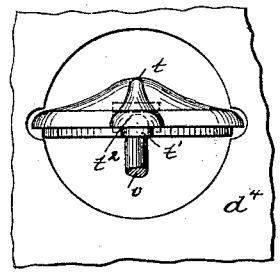

Referring to the accompanying drawings, Figure 1 represents a longitudinal section in elevation of our improved boiler. Fig. 2 is an end view thereof. Fig. 3 is an enlarged detail view of the manner in which the tubes leading from the legs of the boiler enter the water-drums. Fig. 4 is a view of our invention as applied to a single water-drum boiler. Figs. 5, 6, 7, and 8 are detail views. Figs. 9, 10, and 11 are views of the hand-holes.

Like letters and numerals indicate like parts in each of the drawings.

Our invention relates particularly to that class of boilers commonly termed "water-tube" boilers, and it is illustrated in connection with such a form of boiler and boiler-furnace.

The letter $a$ represents the walls of the boiler-furnace, and $a'$ the bridge-wall, which separates the fire-chamber $a^2$ from the rear portion of the furnace. The fire-chamber is supplied with the grate-bars $b$, below which is the ash-pit $b'$. The furnace is provided with the ordinary charging-door and door for the removal of ashes, &c.

The water-drums $c\,c'$, where a double boiler is employed, are supported in suitable manner on the walls $a$ of the furnace, said drums being securely held in place by suitable hangers $c^2$. Each end of said water-drums $c\,c'$ is in communication with the legs $d\,d'$, supported at the forward and rear ends of the boiler-furnace, respectively, said legs being connected by the tubes $e$. The pipes $f\,f'$ connect the legs $d\,d'$, respectively, with the drums $c$ and $c'$. These pipes $f\,f'$ pass up through the saddle $g$, which is secured to the water-drums by means of the rivets $g'$. The saddle $g$ may be formed integral with the drum, if desired, and while we have used the term "saddle" we do not wish to limit ourselves in any wise by this term, as it is intended to include all equivalent constructions. This saddle $g$ is a suitable metal shell, preferably formed of wrought-iron, although we do not wish to limit ourselves to any particular kind of metal. The saddle $g$ is formed with the steps or gradations 1, 2, and 3 on each side of its central point $g^2$. Openings $g^3$ are made in each of said steps, through which the pipes $f\,f'$ pass. The water-drums are provided with openings which coincide with the openings $g^3$, so that the pipes $f\,f'$ are in direct communication with the water-drums.

In case of a double boiler, such as illustrated in Fig. 2, each water-drum $c\,c'$ has a saddle $g$ at each end, and said saddles are brought into communication with each other by means of the coupling-section $i$, said coupling-section also providing for the entrance of the tubes $f\,f'$ therein. The outside tube of the tubes $f\,f'$, extending up from the water-legs, has the elbows $j$, forming connection between said tubes and the saddle $g$.

By having the saddle constructed in the manner described with a series of steps the water in circulation is carried from the drums down into the tubes and then up through the tubes at the other end into the water-drums in such a way that the water is carried from and into the drums from different levels instead of simply at one level, as in the ordinary construction of boilers. By the use of the steps each tube enters the water-drums at a different height and beyond each other, so that when the water enters the water-drums the commotion caused by the entrance of the water is not all at one point, as in other boilers of this class, but is distributed across the diameter of the water-drum. Furthermore, as the highest steps are up near the water-line of the boiler as the water descends through the pipes $f'$ the skum on the surface of the water is drained off through said pipes, and in this way purer water is maintained in the water-drums. Furthermore, where double water-drums are employed the coupling $i$, forming communication between the two drums, maintains the water at the same level in both drums, so that a better circulation is maintained. By having the saddle $g$ constructed with the steps a stronger construction is obtained, as each step acts to reinforce the other.

The drums $c\ c'$ may be provided with the ordinary feed-water appliances and the other parts not necessary to be described.

The front leg $d$ is supported on the ledge $a^3$ of the front wall of the furnace, the rear leg $d'$ resting on the rockers $k$, which rest on the plate $k'$ on the ledge $a^4$ of the rear furnace-wall. These rockers $k'$ by having the leg $d'$ resting thereon permit of the expansion of the tubes, said rockers tilting one way or the other, as the case may be. The pipe $l$, leading from the lower end of the leg $d'$, carries off the sediment and mud which may collect in said leg and which is blown out in the ordinary manner. The leg $d'$ extends some distance below the lowest series of tubes $e$, so that space is left at the bottom of said leg for the collection of the mud or sediment. The interior of said leg $d'$ is provided with the inclined plates $m$, which extend from both sides of the interior of the leg, space being left between said plates for the passage of the mud or sediment. These plates prevent the mud or sediment being drawn into the tubes by the pressure of the circulation. Mud or sediment having once been deposited at the bottom of said leg cannot be drawn back again into the tubes. The construction of these water-legs is one of the features of our invention, and we will now describe them in detail.

Figure 7:
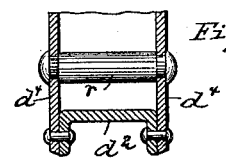
Figure 8:
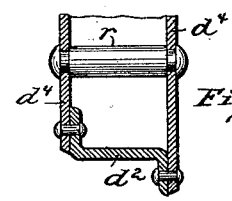

Each leg consists of the flanged channel-bar $d^2$, bent to a frame and its ends welded and having inwardly-extending flanges $d^3$. The outside plates $d^4$ are then riveted to the flanges $d^3$. Heretofore it has been customary to flange the outside plates and then rivet them to a plain annular strip to form the legs. The flanging of these large plates requires costly machinery and is a very expensive operation. The plates are often injured in heating and badly warped, while the annular flanged bars, such as illustrated, can be easily rolled to shape first and then bent, so that the flanging of the large plates $d^4$ is avoided. It is immaterial whether the flanges $d^3$ of the annular channel-bars $d^2$ extend inwardly or outwardly, as the same purpose is effected either way. Channel-bars with the flanges turned outwardly, as well as another form of flange which might be employed, are illustrated in Figs. 7 and 8.

Figure 6:
Figure 5:
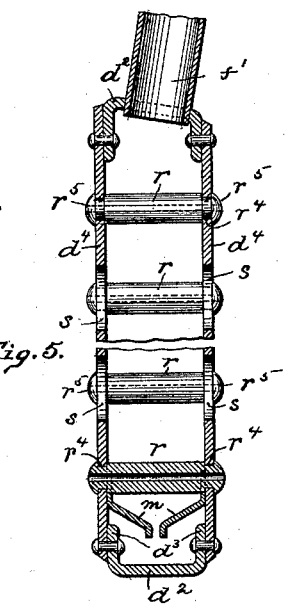

The legs $d\ d'$ are stayed and braced by the stay-bolts $r$, the form of said stay-bolts before they are put into position being shown in Fig. 6. These stay-bolts are preferably hollow, with the shoulders $r'\ r^2$ formed thereon, the necks $r^3$ extending through the openings $r^4$, formed for them in the plates $d^4$. In placing the stay-bolts in position one of the plates is riveted to the frame, when it is turned upside down and all the stay-bolts are put into position. The other plate is then added, with the stay-bolts passing through the openings formed for them. This last plate is then riveted to the frame, whereupon the stay-bolts are riveted. The shoulders $r'$ on the bolts form supports for the plates during the riveting of the bolts or the forming of the heads $r^5$. By this form of stay-bolt we are enabled to do away with the threaded bolts ordinarily employed, which have threaded openings in the plates and which when inserted therein have the heads formed on their ends to hold the bolts in position, the threads preventing the movement of the bolts during the riveting operation. This is avoided by the use of our improved bolt, while at the same time the shoulders on the bolt, engaging with the plates on the inside, act to hold said plates more firmly in position and prevent their sagging or bending in. As stated, these bolts are preferably made hollow in order that by admitting air or steam through them the soot or other foreign matter collecting on the outer surface of the tubes $e$ may be dislodged.

Baffle-plates $n\ n'\ n^2\ n^3$ are employed, preferably formed of tiling, the baffle-plate $n$ extending longitudinally between the tubes $e$ above the fire-chamber and extending beyond the fire-bridge. The baffle-plate $n'$ is supported by the cross-wall $a^5$ beyond the baffle-plate $n$, while the baffle-plate $n^2$ is on top of the bank of tubes $e$, extending back a suitable distance, so that the flame or heat is directed in the direction of the arrows and is prevented from escaping directly to the chimney. The baffle-plate $n^3$ is just in front of the tubes $f'$ and deflects the heat downwardly again through the tubes before it escapes through the flue $o$ and protects said tubes from excessive heat, which would prevent them from carrying the water down from the drums.

The baffle-plate $n'$, through which the tubes $e$ pass, is made up of suitable tiles; but in order to protect said tubes against the wearing action caused by the friction on the withdrawal or insertion of the tubes $e$ said baffle-plate is composed of tiles, with a layer of asbestos $n^4$ or other suitable material interposed between the tiles. This asbestos surrounds the tubes as they pass through the openings formed for them and, projecting slightly beyond the tiles, surrounds the tubes in such a way that upon the insertion or withdrawal of the tubes the wearing action is upon the asbestos and not directly upon the tube. In this way the life of the tubes is greatly extended.

In Figs. 9, 10, and 11 we have shown our improved hand-hole cover enlarged and in detail. The outside plates $d^4$ of the legs have the circular openings $s$ formed therein, said openings having the recesses $s'$ at opposite points therein. The covers $t$ have the lugs $t'$ formed therein, adapted when the covers are in position to enter the recesses $s'$. Enlargements $t^2$ are formed on the rim of the cover beyond the lugs $t'$. At the center of the cover is the seat $u$, adapted to receive the head $v'$ of the bolt $v$. There is a passage $u'$ leading to the seat $u$, said passage $u'$ not extending to the bottom of said seat, so that a shoulder $u^2$ is formed to engage the head of the bolt on one side. The ordinary clamping-piece $w$ is employed to secure the cover in place. The cover is inserted in the following manner: The cover enters the opening edgewise in the position shown in Fig. 11, and by having the bolt movable in the seat $u$ the head of said bolt may be moved into the passage $u'$ in such a way as to bring the shank of said bolt to such an angle as to permit its entering the opening. When the cover has been inserted, it is turned to bring its flat face up against the inner face of the plate and is also given a quarter-turn to bring the lugs $t'$ into coincidence with the recesses $s'$, when the head of the bolt is slipped back into the seat $u$ and brought to a position at right angles to the cover. The nut $x$ is then tightened and the cover is held securely in place. A gasket may be interposed between the inner face of the plate and the rim of the cover. The lugs prevent the turning of the cover when the nut is tightened or unscrewed.

In Fig. 4 we have illustrated our invention as applied to a single water-drum boiler; but as the construction is identical with the double water-drum construction, with the distinction which has already been referred to hereinbefore, no further description is deemed necessary.

When our improved boiler is in operation, the part above the fire-chamber being the hottest portion of the boiler, the circulation is up through the tubes $e$, through the leg $d$, pipes $f$ into the water-drums, thence down the pipes $f'$ and through the leg $d'$ into the tubes $e$. The water as it passes up through the pipe $f$ enters the saddle $g$, each tube of the series entering said saddle at a point higher than the previous one, starting from the lowest point of the water-drum. This is owing to the steps formed in said saddle, and in this way the admission of the water is distributed across the entire water-drum in such a way that the commotion caused by the entrance of the water is not all confined to one point, as in the ordinary cases, but is distributed in such a way that the mud and sediment collecting at the bottom of the drum are not disturbed and raised up to intermingle with the pure water above. By the same arrangement the scum floating on the surface of the water is permitted to pass off through the pipes leading into the highest steps. Furthermore, the coupling $i$ brings the two water-drums into communication and keeps the water-level in each of them practically the same, while at the same time the circulation is maintained in a better manner.

What we claim as our invention, and desire to secure by Letters Patent, is—

1. In a boiler, the combination with legs and tubes connecting the same, of a drum having a series of openings in its lower half, a saddle on said drum, a series of horizontal steps formed on said saddle and having openings therein coinciding with the openings in said drum, the highest of said steps being adjacent to the water-line of said drum, and vertical tubes connecting said legs with the steps on said saddle, substantially as set forth.

2. In a boiler, the combination with the legs and tubes connecting the same, of two or more drums, saddles secured thereto and in communication with said drums, a series of horizontal steps formed on said saddles, the highest of said steps being adjacent to the water-line of said drums, tubes leading from the legs into openings in the steps of said saddles, and a coupling connecting the said saddles at a point above the highest step, whereby the drums are in communication with each other, substantially as set forth.

3. In a boiler, the combination with the legs and tubes connecting the same, of two or more drums, saddles connected to said drums and in communication therewith, a series of horizontal steps formed on said saddles, the highest of said steps being adjacent to the water-line of the drums, a coupling connecting said saddles at a point above the highest step, and tubes leading from said legs to the several steps of said saddles and to the coupling connecting the same, substantially as set forth.

4. In a boiler, the combination with water-legs and tubes connecting the same, of a rocker resting on a suitable support, one of said water-legs resting on said rocker, substantially as set forth.

5. In a boiler, the combination with water-legs and tubes connecting the same, of a semi-cylindrical rocker resting on a suitable support, one of said water-legs resting on said rocker, substantially as set forth.

In testimony whereof we, the said PATRICK MEEHAN and JOHN J. MEEHAN, have hereunto set our hands.

PATRICK MEEHAN.
JOHN J. MEEHAN.

Witnesses:
GEO. W. MILLER,
H. H. GRAHAM.